Figure 1:
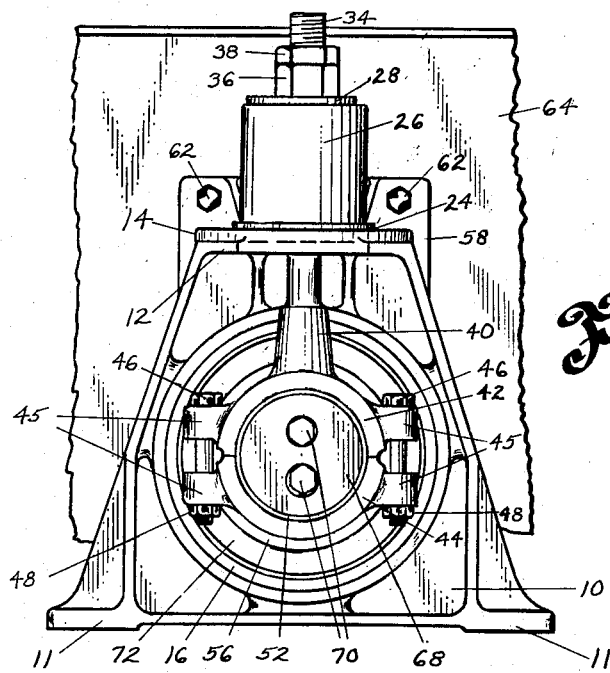

Nov. 2, 1954     L. E. SOLDAN     2,693,331
SUPPORT FOR VIBRATING EQUIPMENT
Filed Jan. 17, 1949     2 Sheets-Sheet 1

INVENTOR
Lewis E. Soldan
BY
*Rey Eilers*
ATTORNEY

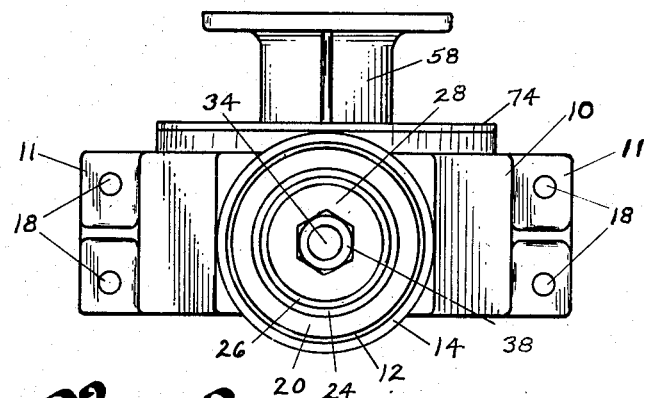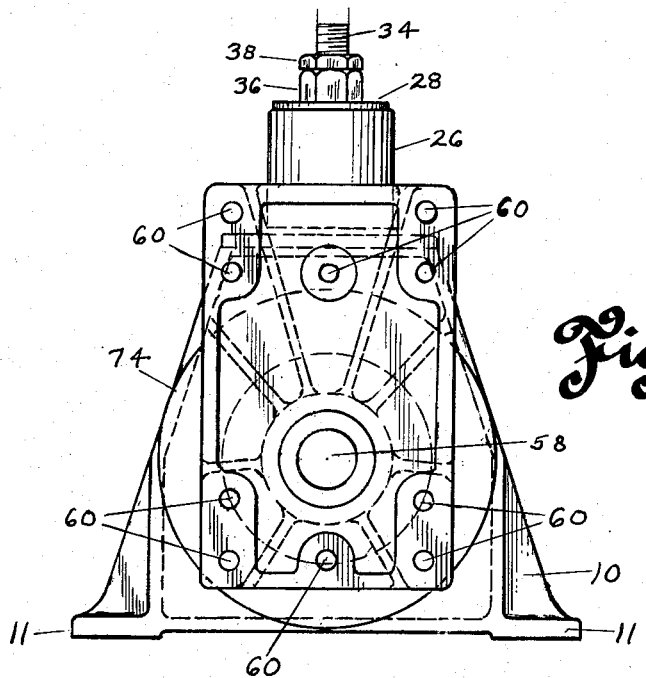

United States Patent Office 2,693,331
Patented Nov. 2, 1954

2,693,331

SUPPORT FOR VIBRATING EQUIPMENT

Lewis E. Soldan, San Diego, Calif., assignor to Productive Equipment Corporation, Chicago, Ill., a corporation of Illinois Application January 17, 1949, Serial No. 71,267

4 Claims. (Cl. 248—18)

This invention relates to improvements in vibrating equipment. More particularly, this invention relates to an improved pedestal that can be used with vibrating equipment to facilitate relatively undampened vibration of the vibratable portions of that equipment.

It is therefore an object of the present invention to provide an improved pedestal that permits relatively undampened vibration of the vibratable portions of vibrating equipment.

In the operation of vibrating equipment, it is often desirable to mount a number of pedestals firmly on a supporting structure, and then secure the vibratable portion of the vibrating equipment to the pedestals. Where this is done the pedestals can act to hold the vibrating equipment in position while permitting the vibratable portion of that equipment to move with but little dampening of its vibration. To achieve this result and yet avoid undue side sway or longitudinal reciprocation of the vibratable portion of the vibrating equipment is difficult, because the first result requires a yielding mounting while the second result requires a mounting that permits only limited yielding. The problem is particularly difficult since the vibrating equipment customarily experiences short periods of unbalanced movement during starting and stopping cycles; and the vibratable portion of that equipment sways and shifts unduly during those cycles. The present invention provides a mounting pedestal for vibrating equipment that limits undue side sway or longitudinal reciprocation of the vibratable portion of the vibrating equipment while avoiding undesired dampening of the vibration of that portion. It is therefore an object of the present invention to provide a mounting pedestal for vibrating equipment which limits undue side sway or longitudinal reciprocation of the vibratable portion of the vibrating equipment while avoiding undesired dampening of the vibration of that portion.

The pedestal contemplated by the present invention has a resilient element that provides constant and immediate resistance to side sway while permitting limited longitudinal reciprocation before it presents substantial resistance to such reciprocation. This element thus keeps the vibratable portion of the vibrating equipment properly aligned at all times without placing an undue restraint on the vibration of the vibratable portion. It is therefore an object of the present invention to provide a mounting pedestal with a resilient element that immediately resists side sway while permiting limited longitudinal reciprocation before resisting that reciprocation.

The mounting pedestal provided by the present invention has a resilient element adjacent the top thereof, a depending rod extending downwardly from that element to support a projection on the vibratable portion of the vibrating equipment, and a resilient element between the lower end of the depending rod and the said projection. The resilient elements at the upper and lower ends of the depending rod tend to isolate that rod from the vibratable portion of the vibrating equipment and from the supporting structure for the vibrating equipment. Such isolation of the depending rod tends to avoid the generation in that rod of standing waves that would fatigue the material of the rod, and it also tends to minimize dampening of the vibration of the vibratable portion of the vibrating equipment. It is therefore an object of the present invention to provide a depending rod which is isolated from the supporting structure and from the vibratable portion of the vibrating machine by two resilient elements.

The depending rod of the present invention is secured to a projection on the vibratable portion of the vibrating equipment by an annulus of yielding material and is secured to the supporting structure by a sleeve of yielding material. The material in the annulus will roll and the material in the sleeve will shift whenever forces are applied to the depending rod; and all parts of the pedestal are spaced away from the central portion of the rod, thereby permitting the rod to flex throughout its entire length. These arrangements avoid concentrations of stresses at one or more points between the ends of the rod and also minimize bending of that rod, thereby prolonging the life of that rod. It is therefore an object of the present invention to provide a depending rod for a mounting pedestal which is permitted to bend throughout its length and is supported at one end by a resilient annulus and is supported at the other end by a resilient sleeve.

The upper end of the depending rod is supported and surrounded by the resilient sleeve; and that sleeve is spaced from the surface of the rod by annular projections on washers at the opposite ends of the sleeve. One washer is centered by the upper end of the rod and the other washer is centered by a platform on the pedestal; and the projection on each washer engages the resilient sleeve and positively holds its inner surface away from the rod. In this way, permanent spacing of the sleeve and rod are attained.

Other and further objects and advantages of the present invention should become apparent from an examination of the drawing and accompanying description.

In the drawing and accompanying description a preferred embodiment of the present invention is shown and described but it should be understood that the drawing and accompanying description are for the purposes of illustration only and do not limit the invention and that the invention will be defined by the appended claims.

Figure 2:
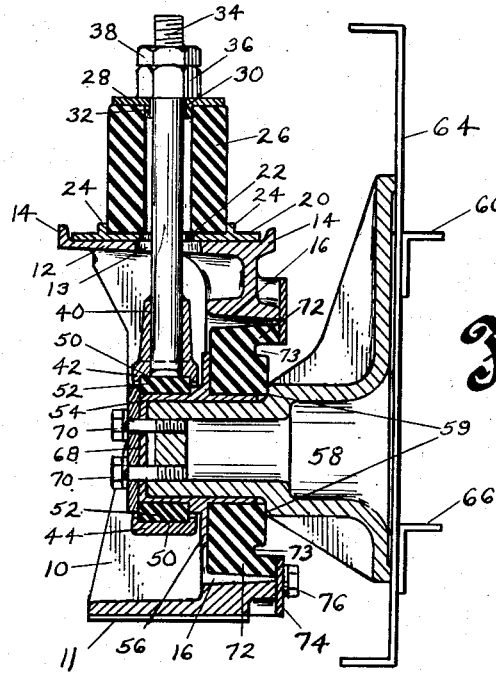

In the drawing Fig. 1 is a front elevational view of a mounting pedestal that is made in accordance with the principles and teachings of the present invention, Fig. 2 is a cross-sectional, side view of the mounting pedestal shown in Fig. 1, Fig. 3 is a plan view of the mounting pedestal shown in Figs. 1 and 2, and Fig. 4 is a rear elevational view of the mounting pedestal shown in Figs. 1–3.

Referring to the drawing in detail, the numeral 10 denotes a generally triangular frame for the pedestal contemplated by the present invention. The frame 10 has two widely spaced feet 11 and has a supporting platform 12 at the top thereof. The supporting platform 12 is disposed horizontally between the two spaced feet 11 of the frame 10, and thus the frame 10 will be strongly resistant to tilting or shifting even though heavy forces are applied to the platform 12. The platform 12 has an opening 13 disposed centrally thereof, and it also has an upwardly directed flange 14 of circular configuration around its outer periphery; the flange 14 being concentric with the opening 13 in the platform 12. The frame 10 of the pedestal has a large annular opening 16, and the surface of that annular opening is tapered; the diameter at the front of the opening being larger than the diameter at the rear of the opening. The widely spaced feet 11 of the frame 10 has openings 18 that can receive bolts, screws, or the like to secure the pedestal to a supporting structure, such as the floor or beams of a building.

The upwardly directed flange 14 of the platform 12 on frame 10 receives a washer 20 which has a central opening 22 that is adapted to be placed in register with the opening 13 in the platform 12. The washer 20 has an annular projection 24 extending upwardly above the surface of the washer, and that projection is concentric with the opening 22 in the washer. The diameter of the washer 20 is such that the washer is closely confined by the flange 14 on platform 12, and thus the opening 22 and the projection 24 will always be concentric with opening 13 in platform 12.

The annular projection 24 on washer 20 has an internal diameter large enough to receive the lower end of a tubular sleeve 26 of resilient material such as rubber, synthetic rubber, or the like. This tubular sleeve extends upwardly from the washer 20, and it has a longitudinal opening therethrough which has a diameter only a trifle smaller than the diameter of the opening 22 in the washer 20. A washer 28 is provided to engage and be supported by the upper end of the tubular sleeve 26, and that washer has an opening 30 therein which can be placed in register with the opening through the tubular sleeve 26. The washer 28 has an annular projection 32, concentric with the opening 30, that extends down inside the tubular sleeve 26 and extends toward the washer 20. The projection 32 positively holds the opening 30 in register with the opening through the sleeve 26. The tubular sleeve 26 spaces the two washers 20 and 28 apart but is yieldable to permit yielding movement of the washers toward each other when the vibrating equipment operates.

A vertically disposed rod 34 extends through the opening 30 in the washer 28, through the longitudnial opening in tubular sleeve 26, through the opening 22 in the washer 20, and through the opening 13 in the frame 10. This rod is threaded at its upper end to receive an adjusting nut 36 and a lock nut 38; and the lower end of the rod depends downwardly from those nuts. Rotation of the adjusting nut 36 relative to the rod 34 will position the rod 34 relative to the frame 10; and the rod can be fixed in that position by rotation of the lock nut 38 into locking engagement with the nut 36.

The lower end of the depending rod 34 extends into and is secured within a recessed stud 40 on a semi-annulus 42. The lower end of the rod 34 may be secured within the stud 40 in any desirable manner, but it has been found that it can be readily secured within that recess by welding. The use of welding makes it unnecessary to thread the lower end of the rod 34, thereby making it possible to avoid the concentration of stresses and strains encountered adjacent threads. By avoiding the use of threads, the present invention provides a long-lived rod 34.

The semi-annulus 42 has its free ends extending downwardly to engage a semi-annulus 44 of complementary curvature and configuration. Each of the semi-annuli 42 and 44 has eyes 45 on the outer ends; and these eyes receive bolts 46 which cooperate with nuts 48 to hold the semi-annuli 42 and 44 in assembled relation. When assembled, the semi-annuli 42 and 44 cooperate with the rod 34 to form a unitary structure which is the equivalent of an I bolt.

Each of the semi-annuli 42 and 44 has a semi-annular groove 50 which is concentric with the semi-annuli 42 and 44; and the semi-annular grooves 50 in each of the semi-annuli 42 and 44 are held in register to form a continuous concentric groove in the I bolt. An annular ring 52 of yielding material, as for example, rubber, synthetic rubber, or the like, is confined within the annular groove in the semi-annuli 42 and 44; the groove holding the ring 52 against shifting.

The outer diameter of the annulus 52 is somewhat larger than the internal diameter of the annular groove formed in the semi-annuli 42 and 44; as a result when the semi-annuli are assembed, they will exert a clamping action on the annulus 52. The internal diameter of the annulus 52 is large enough to receive a cup-like sleeve 54, but the sleeve 54 must be pressed into the annulus 52. Sleeve 54 is disposed along an axis parallel to the axis of the annulus 52, and the sleeve has a stepped flange 56 intermediate its ends. The small diameter portion of flange 56 abuts against one side of the annulus 52 and prevents shifting of that annulus to the right along the sleeve 54. This small diameter portion of flange 56 also extends into the rear of the annular opening formed by the semi-annuli 42 and 44, but the diameter of that portion of flange 56 is small enough to provide sufficient clearance to prevent contact between the semi-annuli 42 and 44 and flange 56.

The sleeve 54 telescopes over a hollow stub projection 58 which has a broad securing flange at the rear thereof; and the securing flange has openings 60 therein to receive bolts 62. Bolts 62 seat in the upstanding side walls 64 of the vibratable portion of the vibrating device mounted on the pedestals. The side walls 64 are equipped with elements 66 which assist in supporting the porous screens used in the vibrating device. The side walls 64 and the porous screen, not shown, will be caused to vibrate by a vibration-imparting mechanism of the usual type.

A confining washer 68 is provided that has a diameter larger than that of the sleeve 54 but is smaller than that of the internal diameters of the semi-annuli 42 and 44. This washer overlies the closed end of the cup-like sleeve 54, and it has two spaced openings in register with openings in the closed end of sleeve 54 and with openings in the end of the stub 58. Bolts 70 can be passed through the openings in washer 68 and through the openings in sleeve 54 to seat in the openings in the end of stub 58 and hold washer 68 in place. When washer 68 is held in place against the end of the cup-like sleeve 54, the washer 68 will press against the outer face of the annulus 52 and hold that annulus against the small diameter portion of flange 56 on sleeve 54. Thus, annulus 52 is positively held in position relative to the cup-like sleeve 54, and is also held in fixed position relative to the stub 58.

An annular element 72 of yielding material is positioned within the annular opening 16 of the frame 10, and that annulus has an annular backing plate 74 vulcanized or otherwise secured to it. The backing plate 74 has a diameter slightly larger than that of the annulus 72, and it extends behind and overlies the rear of the frame 10. Bolts 76 pass through openings in the backing plate 74 and seat in the rear of frame 10 to hold annulus 72 in position. The annulus 72 has an external taper; the front of the annulus having a smaller diameter than the rear. As a result, there is an air gap of annular form and V-shaped cross section between the annular opening 16 of the frame 10 and the surface of the annulus 72. This air gap cooperates with the annular recess 73 in annulus 72 to make the annulus 72 readily responsive to longitudinal reciprocation for limited distances while providing a check to undesired reciprocation. At the same time, the annulus 72 provides an immediate and continuous resistance to side thrust.

As the side wall 64 begins to move within its plane, the material of which annulus 72 is made will yield adjacent recess 73 and permit the sub 58 to move without resistance. However, continued movement of the stub 58 will be effectively checked by the engagement of the outer periphery of annulus 72 with annular opening 16; and the deformation of annulus 72 prior to such engagement will apply checking forces of gradually increasing magnitude to the stub 58. As a result, the stub 58 will gradually be brought to a stop without shock or impact.

It will be noted that the stub 58 has a shoulder 59 that engages one side face of the annulus 72; the other side face of the annulus 72 being engaged by the large diameter portion of flange 56. The resulting confinement of annulus 72 holds the inner periphery of annulus 72 solidly against shifting; any shifting of the annulus 72 being restricted to its outer periphery. However, the width of annulus 72 is such that very little transverse shifting of annulus 72 is possible; and thus the pedestal provides immediate and strong resistance to side sway.

With this arrangement, the mounting pedestal can be secured to a supporting structure, as for example the floor or the beams of a building; and it will then support the side wall 64 by first supporting tubular sleeve 26 and then supporting rod 34, semi-annuli 42 and 44, yielding annulus 52, cup-like sleeve 54, and stub 58. While the side wall 64 is thus supported by the floor or beams of the building, it is spaced from the floor or beams by tubular sleeve 26 and annulus 52. Moreover, it is held against side sway by annulus 72.

Whereas a preferred embodiment of the present invention has been shown and described in the drawing and accompanying description it should be obvious to those skilled in the art that various changes can be made in the form of the invention without affecting the scope thereof.

What I claim is:

1. A mounting pedestal for a vibrating device that comprises a frame, a resilient element supported by said frame, a hanger depending from and supported by said resilient element, a second resilient element supported by said hanger, a projection on the vibratable portion of said vibrating device that engages and is supported by said second resilient element, a third resilient element that engages and extends between said frame and said projection to limit side sway of said vibratable portion of said vibrating device, said third resilient element having a recess therein that yields during longitudinal reciprocation of said vibratable portion of said vibrating device, a tapered surface on said third resilient element, and a tapered surface on said frame, said tapered surfaces being movable relative to each other to permit relatively unimpeded reciprocation of said vibratable portion of said vibrating device for short distances but providing gradually increasing checking forces to undue reciprocation.

2. A mounting pedestal for a vibrating device that comprises a frame, a resilient element supported by said frame, a hanger depending from and supported by said resilient element, a second resilient element supported by said hanger, a projection on the vibratable portion of said vibrating device that engages and is supported by said second resilient element, and a third resilient element that engages and extends between said frame and said projection to limit side sway of said vibratable portion of said vibrating device, said third resilient element having a recess therein that yields during longitudinal reciprocation of said vibratable portion of said vibrating device.

3. A mounting pedestal for a vibrating device that comprises a frame, a resilient element supported by said frame, a hanger depending from and supported by said resilient element, a second resilient element supported by said hanger, a projection on the vibratable portion of said vibrating device that engages and is supported by said second resilient element, and a third resilient element that engages and extends between said frame and said projection to limit side sway of said vibratable portion of said vibrating device.

4. A mounting pedestal for a vibrating device that comprises a frame, a resilient element supported by said frame, a hanger depending from and supported by said resilient element, a second resilient element supported by said hanger, a projection on the vibratable portion of said vibrating device that engages and is supported by said second resilient element, and a third resilient element that is disposed between said frame and said projection, said third resilient element and said frame defining an air gap of tapered cross section into which said third resilient element can deform under stress.

References Cited in the file of this patent

UNITED STATES PATENTS

| Number | Name | Date |
|---|---|---|
| 1,732,647 | Flintermann | Oct. 22, 1929 |
| 1,929,700 | Malone | Oct. 10, 1933 |
| 2,022,099 | Wolfram et al. | Nov. 26, 1935 |
| 2,110,701 | Farmer | Mar. 8, 1938 |
| 2,215,743 | Saurer | Sept. 24, 1940 |
| 2,338,323 | Fink | Jan. 4, 1944 |
| 2,376,317 | Wallerstein, Jr. | May 15, 1945 |
| 2,389,562 | Storch | Nov. 20, 1945 |
| 2,399,414 | Wells et al. | Apr. 30, 1946 |
| 2,484,191 | Soldan | Oct. 11, 1949 |

FOREIGN PATENTS

| Number | Country | Date |
|---|---|---|
| 50,180 | France | Oct. 10, 1929 |
| | (1st addition to No. 812,721) | |
| 439,512 | France | June 15, 1912 |